(12) United States Patent
Cretegny

(10) Patent No.: US 7,946,467 B2
(45) Date of Patent: May 24, 2011

(54) BRAZE MATERIAL AND PROCESSES FOR MAKING AND USING

(75) Inventor: Laurent Cretegny, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 494 days.

(21) Appl. No.: 11/611,297

(22) Filed: Dec. 15, 2006

(65) Prior Publication Data

US 2008/0142575 A1 Jun. 19, 2008

(51) Int. Cl.
*B23K 35/14* (2006.01)

(52) U.S. Cl. .......... 228/56.3; 228/256; 75/252; 75/255; 428/570

(58) Field of Classification Search .......... 228/256, 228/56.3; 75/252, 255; 428/570
See application file for complete search history.

(56) References Cited

U.S. PATENT DOCUMENTS

| | | | |
|---|---|---|---|
| 5,321,223 A | 6/1994 | Kimrey, Jr. et al. | |
| 5,385,789 A * | 1/1995 | Rangaswamy et al. | 428/570 |
| 5,397,530 A | 3/1995 | Narasimhan et al. | |
| 5,736,092 A | 4/1998 | Apte et al. | |
| 5,740,941 A | 4/1998 | Lemelson et al. | |
| 5,808,282 A | 9/1998 | Apte et al. | |
| 6,004,505 A | 12/1999 | Roy et al. | |
| 6,063,333 A | 5/2000 | Dennis | |
| 6,155,331 A | 12/2000 | Langer et al. | |
| 6,165,616 A | 12/2000 | Lemelson et al. | |
| 6,172,346 B1 | 1/2001 | Wroe | |
| 6,183,689 B1 | 2/2001 | Roy et al. | |
| 6,210,812 B1 * | 4/2001 | Hasz et al. | 428/621 |
| 6,293,986 B1 | 9/2001 | Rodiger et al. | |
| 6,348,081 B1 * | 2/2002 | Horata et al. | 75/246 |
| 6,512,216 B2 | 1/2003 | Gedevanishvili et al. | |
| 6,610,241 B2 | 8/2003 | Shrout et al. | |
| 6,805,835 B2 | 10/2004 | Roy et al. | |
| 6,870,124 B2 | 3/2005 | Kumar et al. | |
| 2002/0106611 A1 | 8/2002 | Bhaduri et al. | |
| 2004/0050913 A1 * | 3/2004 | Philip | 228/194 |
| 2006/0071053 A1 | 4/2006 | Garimella | |

FOREIGN PATENT DOCUMENTS

| | | |
|---|---|---|
| EP | 0456481 | 11/1991 |
| EP | 1642666 | 5/2006 |
| WO | WO2004073037 | 8/2004 |

* cited by examiner

*Primary Examiner* — Jessica L Ward
*Assistant Examiner* — Nicholas P D'Aniello
(74) *Attorney, Agent, or Firm* — Francis T. Coppa

(57) ABSTRACT

A braze material and processes for making and using the material, such as for use in the manufacturing, coating, repair, and build-up of superalloy components. The braze material is composed of particles with melt-modifying constituents that are limited to the surfaces of the particles, yet are capable of sufficiently promoting the heating of the particles by conventional means and microwave radiation to achieve at least partial melting of the particles. The melt-modifying constituents are in the form of particulates embedded in the outer surface region of each particle. The particulates are formed of melting point depressant(s) and/or microwave coupling enhancer(s), are much smaller than the particle in which they are embedded.

18 Claims, 2 Drawing Sheets

BRAZE MATERIAL AND PROCESSES FOR MAKING AND USING

BACKGROUND OF THE INVENTION

This invention generally relates to braze materials and processes for making and using braze materials, such as for use in the manufacturing, coating, repair, and build-up of superalloy components. More particularly, this invention relates to braze material powders composed of particles with melt-modifying constituents on their surfaces, and to processes for producing and using such powders.

Nickel, cobalt, and iron-base superalloys are widely used to form high temperature components of gas turbine engines. While some high-temperature superalloy components can be formed as a single casting, others are preferably or necessarily fabricated by other processes. As an example, brazing can be used to fabricate certain gas turbine components, such as high pressure turbine nozzle assemblies. Brazing is also used to repair cracks and other surface flaws and damage, build up surfaces to restore desired dimensions, and form protective coatings on gas turbine engine components. Brazing techniques of these types encompass heating a braze material, typically in the form of a braze alloy powder, a paste or tape containing a braze alloy powder, or a sintered preform of a braze alloy powder, to a temperature above the melting point of the braze alloy, but sufficiently below the melting point of the material being brazed to avoid damaging and/or reducing desired properties of the material. (As used herein, "melting point" is meant to encompass the incipient melting point for alloys that do not have a true melting point but instead have a melting range.) For example, brazing temperatures are typically limited to avoid grain growth, incipient melting, recrystallization, and/or unfavorable phase formation.

In situations where a brazement must have a composition and properties similar to the substrate being brazed, the braze alloy will typically have a composition essentially or nearly the same as the substrate, but modified to contain one or more melting point suppressants, such as boron and/or silicon, which form low melting eutectics with the substrate material. In the past, braze alloy powders have been prepared by combining their alloying constituents through such processes as atomization and mechanical alloying to yield a powder whose particles have a uniform composition. For example, EP0456481 reports a process in which a titanium-based braze alloy powder is formed by mechanically alloying powders of each elemental constituent of the braze alloy, including powders of nickel and/or copper as the melting point depressant(s), to create a presumably uniform distribution of the elements in the braze alloy powder.

A difficulty encountered when brazing certain alloys is the tendency for some melting point depressants to form embrittling phases, such as chromium borides that form when brazing chromium-containing superalloys. As a result, brazing is not an appropriate manufacturing or repair process for some applications, particularly many components in the hot gas path of a gas turbine engine. In any case, the amounts of melting point depressants contained in a braze alloy are intentionally limited and sometimes partitioned to minimize their detrimental effects. An example of the latter is the use of a braze alloy system comprising two braze powders, one containing one or more melting point depressants and the other nominally having the same composition as the component being brazed. The higher-melting powder acts as a sink for the excess melting point depressants in the lower-melting powder during and after the brazement is formed. However, segregation of the two powders can occur during the brazing process, with the lower-melting powder taking most of the working volume of the brazement and displacing the higher-melting powder. If this occurs, an excess of melting point depressants will be present in the brazement, which in turn affects the mechanical properties of the brazement.

Microwave brazing has been investigated as a potential candidate for eliminating issues associated with conventional brazing techniques, as microwave heating has the potential for localizing heat in selected areas of a component. Two approaches have generally been proposed for microwave brazing. A first entails the use of a susceptor (e.g., SiC enclosure) that is heated when exposed to microwave energy and, in turn, transfers the heat to the component by radiation. Drawbacks to this approach are lack of local heating of the braze alloy only, as an entire region of the component is inevitably heated, and significant heat loss from radiation in directions away from the intended brazement. A second approach entails direct microwave heating of a braze alloy powder, which is more susceptible to absorbing microwave energy than bulk metals, which reflect microwaves. Because typical braze alloy compositions do not couple sufficiently with microwave energy to be fully melted, it has been proposed to alloy braze powders to contain one or more microwave coupling enhancers that are more highly susceptible to microwave radiation than the base alloy composition of the braze powder. For example, commonly-assigned U.S. Pat. Nos. 7/541,561 and 7/326,892 disclose the addition to a braze alloy powder of materials capable of behaving as microwave coupling enhancers, such as silicon, germanium, gallium, cobalt, iron, zinc, titanium, carbon (e.g., carbon nano-tubes or fine graphite powder), aluminum, tantalum, niobium, rhenium, hafnium, molybdenum, and silicon carbide (SiC). Powders of the microwave coupling enhancers can be intermixed with a powder of the braze alloy, or the braze alloy can be alloyed to contain one or more microwave coupling enhancers. However, there is an ongoing need to improve the heating rate of braze powders by microwave radiation while avoiding losses in properties that might occur if levels of microwave coupling enhancers are simply increased to promote melting of the braze alloy.

In view of the above, it would be desirable if a braze alloy powder could be produced to contain one or more melt-modifying constituents, such as melting point depressants and microwave coupling enhancers, but in a form that has minimal negative impact of the mechanical properties of the resulting brazement, and allows for broader use of brazing processes and technology, especially for use in the manufacture and repair of gas turbine engine components.

BRIEF SUMMARY OF THE INVENTION

The present invention generally provides braze materials and processes for making and using braze materials, such as for use in the manufacturing, coating, repair, and build-up of superalloy components. More particularly, the invention provides and makes use of braze materials containing particles with melt-modifying constituents that are limited to the surfaces of the particles, yet are capable of sufficiently promoting the heating of the particles by conventional means and microwave radiation to achieve at least partial melting of the particles.

According to one aspect of the invention, a braze material is provided comprising a particle and a plurality of particulates that are embedded in the outer surface region of the particle and substantially absent from a core region of the particle. The particulates are formed of at least one material that acts as melt-modifying constituent, namely, a melting point depressant and/or a microwave coupling enhancer. If the former, the particulates are formed of one or more materials with lower melting points than the melting point of the material of the particle, whereas in the latter case suitable materials are those more susceptible to heating by microwave radiation than the particle. According to the invention, the particulates are much smaller than the particle in which they are embedded, for example, the particulates have a nominal size of less than 1/100 of the nominal size of the particle. The particulates are present in the outer surface region of the particle in an amount sufficient to enable at least the outer surface region to melt when the particle is heated by conventional means or microwave radiation, depending on whether the particulates are melting point depressants or microwave coupling enhancers. If the former, the particulates initiate melting when the particle is heated to a temperature above the melting point of the particulates but less than the melting point of the particle. If the latter, the particulates initiate melting when the particle is subjected to heating by microwave radiation.

According to another aspect of the invention, a process is provided for producing such a braze material. The process generally entails mechanically alloying a particle with a plurality of particulates formed of one or more melt-modifying constituents, so that the particulates become embedded in the outer surface region of the particle and are substantially absent from the core region of the particle, such as described above. According to another aspect of the invention, a process is provided for using such a braze material, in particular, a braze material powder made up of a plurality of particles, each with a plurality of particulates embedded in its outer surface region, such as described above. The process generally entails heating the braze material (by conventional means or by microwave radiation) to cause at least the outer surface regions of the particles to melt, and then allowing the particles to cool, solidify, and form a solid brazement.

From the above, it can be appreciated that the process of this invention can be applied to various processes in which heating of a powdered material is desired, for example, to form a coating, repair or build-up a surface, or metallurgically join components by brazing. Furthermore, the invention is applicable to both conventional heating methods, such as vacuum furnace brazing, and microwave brazing processes. In each case, the very fine distribution of melt-modifying particulates limited to the outer surfaces of the particle creates a composite particle structure in which the outer surface region of the particle defines the melting characteristics of the particle, while the interior of the particle fully retains the mechanical properties desired for the brazement. In the case of vacuum brazing methods, the present invention has the ability to enhance the mechanical properties of a brazement, allowing for broader use of braze technology. For microwave brazing applications, the invention has the ability to significantly promote heating and melting of particles by microwave radiation that may not otherwise be sufficiently susceptible to microwave heating.

In view of these benefits, the present invention is particularly advantageous for use in coating, joining, and crack-filling (repairing) of superalloy components, including those found in the hot gas path of gas turbine engines. The invention is believed to be useful in joining, coating, and repair applications in which limited flow of a braze material is required, though the invention is also applicable to crack repairs and other procedures in which a braze material must readily flow over a large surface area before solidifying.

Other objects and advantages of this invention will be better appreciated from the following detailed description.

DETAILED DESCRIPTION OF THE INVENTION

The invention will be described with reference to processing of components for a gas turbine engine, and particularly the fabrication, coating, buildup, and repair of such components with a braze material. However, the invention has application to a variety of components, materials, and processes other than those discussed, and such variations are within the scope of this invention.

The present invention provides for the ability to enhance the processing and properties of brazements, such as braze joints, coatings, and repairs, by embedding very fine particulates of one or more melting point suppressants and/or microwave coupling enhancers into the outer surface of a particle whose composition can be a braze alloy tailored for the intended application. For example, for a gas turbine engine component formed of a superalloy, such as a nickel or cobalt-based superalloy, the braze alloy may have the very same superalloy composition as the component being brazed. In view of the capability of melting particles formed of an alloy having a melting point above that of the component being brazed, it should be appreciated that the term "brazing" as used herein is not limited to the conventional limitation of an operation performed at a temperature below the melting point of the metal being brazed. Furthermore, the term "alloy" is meant to encompass not only metallic alloys, but nonmetallic compositions capable of being melted.

Figure 1:
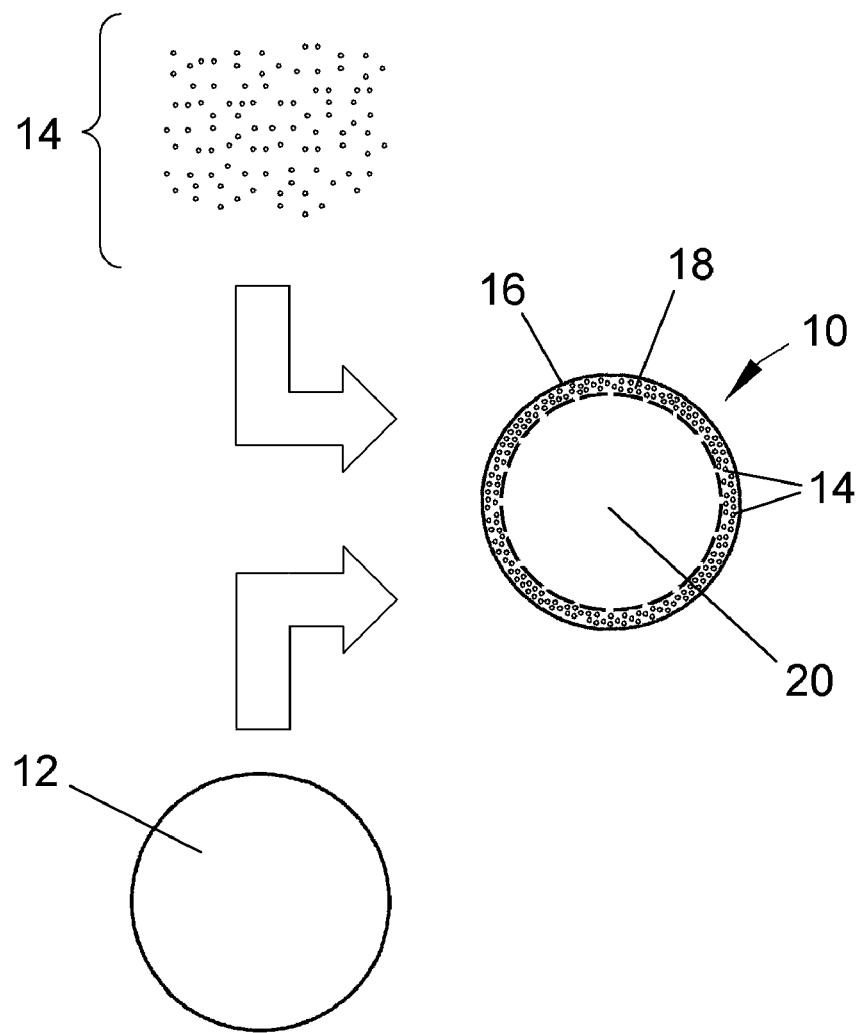
FIG. 1 schematically represents a process of mechanically alloying fine particulates of at least one melt-modifying constituent with a powder particle to yield a composite braze powder particle in which the particulates are limited to being embedded in the outer surface region of the particle in accordance with a preferred aspect of the invention.

As represented in FIG. 1, the composite braze powder particle 10 is formed by mechanically alloying a braze alloy particle 12 and very fine particulates 14 whose compositions can be the same or different, but in use with the particular braze alloy particle 12 will serve as a melting point suppressant and/or a microwave coupling enhancer, collectively referred to herein as melt-modifying constituents. The particulates 14 are sufficiently fine to enable their embedment or implantation into the outer surface 16 of the particle 12, creating an outer surface region 18 of the composite particle 10 in which the particulates 14 are contained while the remaining core region 20 of the composite particle 10 is essentially free of particulates 14. The size of the particulates 14 relative to the coarser particle 12 is chosen such that the outer surface region 18 of the composite particle 10 has the desired melting characteristics, while the core region 20 retains the composition of the original particle 12. In this manner, within a mass of braze powder particles 10, surface melting of individual particles 10 enables metallurgical bonding to create a solid brazement, while the overall amount of melt-modifying constituent (melting point depressant(s) and/or microwave coupling enhancer(s)) can be reduced as compared to previous braze alloy powders that were either mixed with powders of a melting point depressant or microwave coupling enhancer, or alloyed with a melting point depressant or microwave coupling enhancer. Another advantage is a significant reduction in the diffusion distance between the melt-modifying constituent (the particulates 14) and the braze alloy composition (the particle 12), with the result that once the brazement solidifies, the melt-modifying constituents can readily diffuse toward the center of the particles 10, locally reducing the concentration of melt-modifying constituents in the brazement and thus improving mechanical properties.

To be effective as described above, it should be evident that the particulates 14 must be sufficiently fine relative to the size of the particle 12. For example, with a relatively coarse particle 12 having a size of about −170/+325 mesh (greater than about 44 micrometers to less than about 90 micrometers), a suitable size for the particulates 14 is believed to be up to about 100 nanometers, for a nominal diameter ratio of roughly about 1:1000 to about 1:400 relative to the particle 12. (Particle sizes are nominal sizes based on the maximum dimension of the particles 12 and particulates 14.) However, a size ratio of up to about 1:100 is believed to be acceptable. Furthermore, particles 12 with nominal sizes of at least 10 micrometers up to about 180 micrometers (about 1250 mesh to about 80 mesh) are also within the scope of this invention, as are particulates 14 with nominal sizes of up to about 1 micrometer. With relative sizes within these ranges, the particle 12 and particulates 14 can be mechanically alloyed so that the thickness of the outer surface region 18 containing the particulates 14 is not greater than about 10% of the size (diameter) of the particle 12, for example, up to about 5 micrometers thick in a particle 12 whose size is within the range of about −170 to +325 mesh (greater than about 44 micrometers to less than about 90 micrometers), and up to about 10 micrometers thick for a particle 12 with a maximum size of about 80 mesh (about 180 micrometers).

Also, to be effective as described above, it should be evident that the composite braze powder particle 10 must contain a sufficient amount of the particulates 14. For example, for an alloy particle 12 whose size is within the range of about −170 to +325 mesh, the particulates 14 preferably constitute at least 10 volume percent and up to about 90 volume percent of the outer surface region 18 of the braze powder particle 10 (or roughly 3 to 25 volume percent of the entire particle 10), and more preferably about 30 to about 70 volume percent of the outer surface region 18 (or roughly 8 to 19 volume percent of the entire particle 10).

Optimal sizes and amounts for the particulates 14 will depend in part on the particular composition of the braze alloy particle 12 and the particular composition or compositions of the particulates 14. Suitable melting point depressants include, but are not limited to, such conventional elements as boron, silicon, hafnium, zirconium, manganese, gallium, gold, and palladium. It should be noted that melting point depressants for use with this invention are not limited to materials with melting points lower than that of the particle 12, but include particulates 14 whose compositions will form a eutectic compound with the material of the particle 12, as long as the eutectic compound has a lower melting point than the particle 12. Suitable microwave coupling enhancers include, but are not limited to, silicon, germanium, gallium, cobalt, iron, zinc, titanium, carbon, aluminum, tantalum, niobium, rhenium, hafnium, molybdenum, silicon carbide, nickel oxide, magnetite, and manganese dioxide.

Mechanical alloying is a well-known solid-state metal processing technique by which solids can be metallurgically combined. Generally, the term "mechanical alloying" is used herein to mean any process by which powder particles are plastically deformed and undergo fracturing and cold welding. Common examples include attrition, ball, and shaker mills, which may be conducted at ambient, elevated, and cryogenic temperatures, depending on the particular materials being alloyed. While other methods of incorporating the melt-modifying particulates 14 into the outer surface region 18 of the particle 12 are possible, such as coating-type processing including physical vapor deposition (PVD), chemical vapor deposition (CVD), and diffusion processes, these techniques are much more costly and the quality and consistency of the particles 10 would likely not be as reliable. In contrast, mechanical alloying processes are capable of forming the desired composite structure of the composite braze powder particle 10 as schematically represented in FIG. 1, and also have the benefit of being amenable to batch processing.

Figure 2:
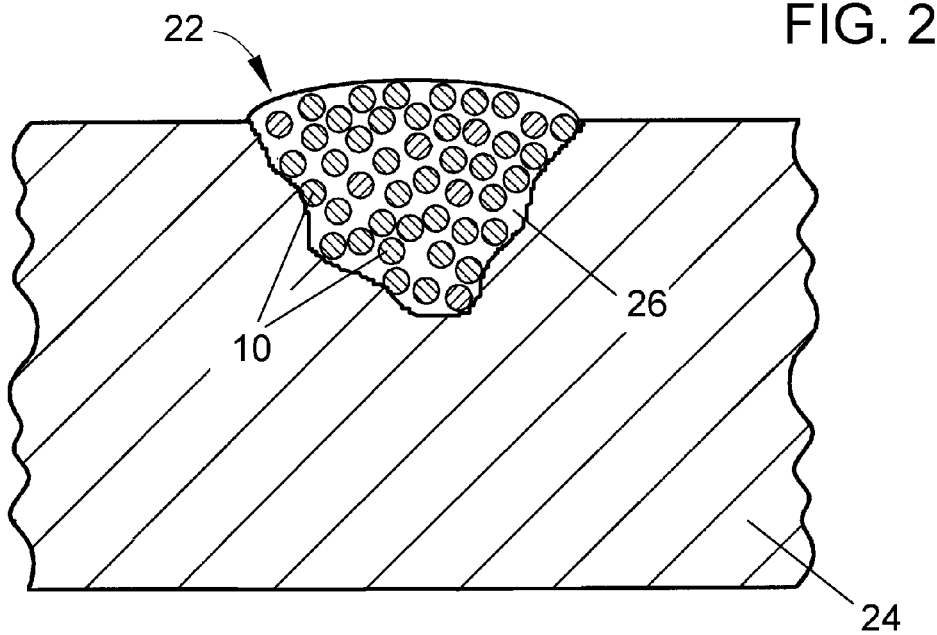
FIG. 2 schematically represents a braze material made up of composite braze powder particles of the type represented in FIG. 1, in which the braze material fills a defect in a surface of a substrate for the purpose of repairing the substrate in accordance with an embodiment of the invention.
Figure 3:
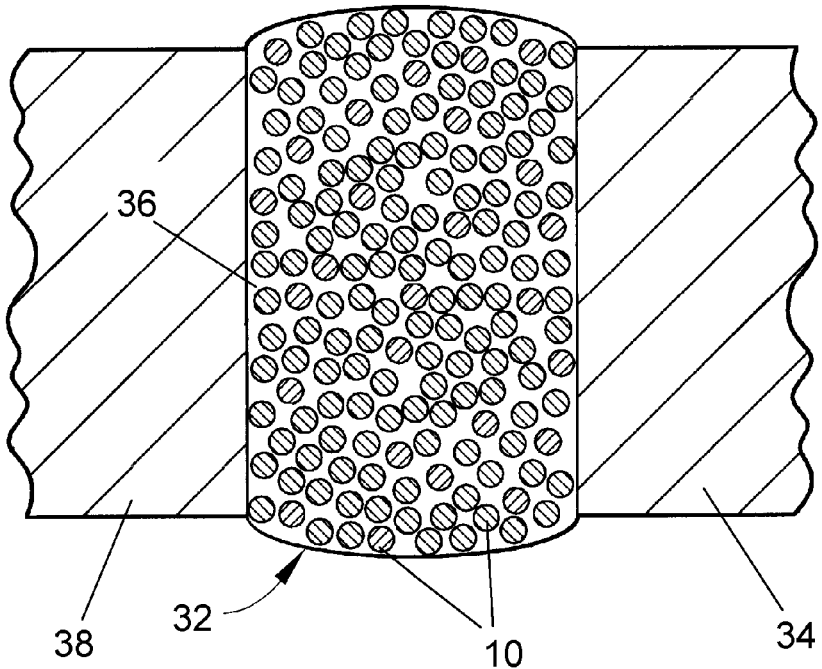
FIG. 3 schematically represents a braze material similar to that of FIG. 2, but placed between a pair of substrates for the purpose of metallurgically joining the substrates in accordance with another embodiment of the present invention.

FIGS. 2 and 3 depict embodiments of this invention in which consistent reference numbers are used to identify functionally similar structures. FIG. 2 schematically represents a braze material 22 containing the composite braze powder particles 10 of this invention deposited on a surface of a substrate 24 for the purpose of repairing a defect in the substrate surface, while FIG. 3 schematically represents a braze material 32 containing the composite braze powder particles 10 of this invention between and contacting opposing surfaces of two substrates 34 and 38 to be metallurgical joined by the particles 10. In both FIGS. 2 and 3, the particles 10 are shown as being contained within binders 26 and 36 that, according to known brazing practices with braze pastes and tapes, burn off during the brazing process, which is preferably performed in an inert or low pressure atmosphere to minimize oxidation of the particles 10 and the surfaces of the substrates 24, 34, and 38 to which the particles 10 are bonded. The substrates 24, 34, and 38 may be formed of a superalloy or any other material suitable for the particular type of component and its anticipated operating conditions. As previously note, the particles 10 can be formed of various metallic and nonmetallic materials for compatibility with the substrates 24, 34, and 38.

Additionally, the braze materials 22 and 32 may be composed of the particles 10 of this invention mixed with other powder particles, as an example, a powder made up of the braze alloy particles 12 of FIG. 1, or another powder composition suitable for the intended repair, coating, or joint and compatible with the substrates 24, 34, and 38. A suitable volume fraction for the particles 10 in such a braze material is about 10% to about 90%, preferably about 30% to about 70%. Forming braze materials containing such a mixture yields a brazement with an even lower overall content of melting point suppressant or microwave coupling enhancer than possible of the particles 10 are used alone.

When sufficiently heated by a conventional heat source or microwave radiation, the particulates 14 embedded in the outer surface regions 18 of the particles 10 begin to melt first and initiate melting of the outer surface regions 18 to the extent that, upon resolidification, the particles 10 form a solid brazement that either repairs the surface defect of FIG. 2 or joins the substrates 34 and 38 of FIG. 3. Though the braze material 22 is shown as being directly placed within the defect in FIG. 2 and the braze material 32 is shown as being directly placed between the substrates 34 and 38 in FIG. 3, it will be understood by those skilled in the art that the braze materials 22 and 32 could be placed over the defect in FIG. 2 and adjacent a gap between the substrates 34 and 38 in FIG. 3, and allowed to flow into the defect and gap by capillary action when molten.

Used in conjunction with conventional vacuum brazing, a braze material made up of the braze powder particles 10 of this invention is believed to be capable of achieving a more uniform joint, coating, or repair. The distribution of the lower-melting composition of the particulates 14 with respect to the higher-melting composition of the particles 12 yields a braze material that is inherently homogeneous and remains homogeneous during application of the braze material and during the brazing process. This homogeneity results in a much better joint integrity and improved mechanical properties, which are typically extremely difficult to achieve in a braze joint because of the tendency for segregation of the lower-melting and higher-melting compositions. The homogeneity of brazements achievable with this invention are believed to be sufficient for use with advanced superalloys, such as the gamma prime-strengthened nickel-base superalloys commercially known as GTD-111 and René N5, as well as other superalloys with particularly exceptional mechanical requirements.

In terms of microwave brazing, the heating rate of the composite braze powder particle 10 by microwave radiation is believed to be improved by several orders of magnitude if particulates 14 of an appropriate material are embedded in the outer surface region 18 of the particle 10. A particularly notable example is preheat-treated silicon as disclosed in U.S. patent application Ser. No. 11/533,845, whose content regarding materials that are highly susceptible to microwave heating is incorporated herein by reference. An additional benefit of microwave brazing is that local melting of the braze powder particles 10 can occur while the substrate or substrates being brazed undergo little if any melting and therefore little if any damage from thermal exposure.

While the invention has been described in terms of particular embodiments, it is apparent that otherforms could be adopted by one skilled in the art. Accordingly, the scope of the invention is to be limited only by the following claims.

The invention claimed is:

1. A braze material comprising:
 a plurality of particles each having a nominal size, an outermost surface, an outer surface region defining the outermost surface, and a core region beneath the outer surface region and constituting the remainder of the particle, wherein each particle is formed of a first material having a melting point; and
 a plurality of particulates embedded within and finely distributed throughout the outer surface region of each particle so as to be contained throughout the outer surface region of each particle, below the outermost surface of each particle, and substantially absent from the core region of each particle, at least some of the particulates being formed of a second material chosen from the group consisting of materials with lower melting points than the melting point of the first material of the particles and materials that are more susceptible to heating by microwave radiation than the first material of the particles, the particulates having a nominal size of less than $1/100$ of the nominal size of the particles and constituting up to 90 volume percent of the outer surface regions of the particles;
 wherein if the melting point of the second material of the particulates is lower than the melting point of the first material of the particles, the particulates are present in the outer surface regions of the particles in an amount sufficient to enable at least the outer surface regions of the particles to melt when the particles are heated to a temperature above the melting point of the particulates but less than the melting point of the particles;
 wherein if the second material of the particulates is more susceptible to heating by microwave radiation than the first material of the particles, the particulates are present in the outer surface regions of the particles in an amount sufficient to enable at least the outer surface regions of the particles to melt when the particles are subjected to heating by microwave radiation.

2. The braze material according to claim 1, wherein the nominal size of the particulates is about 1:1000 to about 1:400 relative to the nominal size of the particles.

3. The braze material according to claim 1, wherein the nominal size of the particles is at least 10 micrometers up to about 180 micrometers.

4. The braze material according to claim 1, wherein the nominal size of the particles is about 44 to about 90 micrometers.

5. The braze material according to claim 1, wherein the nominal size of the particulates is less than 1 micrometer.

6. The braze material according to claim 1, wherein the nominal size of the particulates is about 100 nanometers and less.

7. The braze material according to claim 1, wherein the outer surface regions of the particles extend inward from the outermost surfaces of the particles a distance of up to about 10% of the nominal size of the particles.

8. The braze material according to claim 1, wherein the outer surface regions of the particles extend inward from the outermost surfaces a distance of up to 10 micrometers.

9. The braze material according to claim 1, wherein the particulates constitute about 30 to about 70 volume percent of the outer surface regions of the particles.

10. The braze material according to claim 1, wherein at least one of the first material of the particles and the second material of the particulates is a metallic material.

11. The braze material according to claim 1, wherein at least one of the first material of the particles and the second material of the particulates is a nonmetallic material.

12. The braze material according to claim 1, wherein the first material of the particles and the second material of the particulates are metallic materials.

13. The braze material according to claim 12, wherein the first material of the particles is a superalloy.

14. The braze material according to claim 1, wherein the second material of the particulates forms a compound with the first material of the particles that has a lower melting point than the melting point of the first material of the particles.

15. The braze material according to claim 1, wherein the second material of the particulates has a lower melting point than the melting point of the first material of the particles.

16. The braze material according to claim 15, wherein the second material of the particulates is chosen from the group consisting of boron, silicon, hafnium, zirconium, manganese, gallium, gold, and palladium.

17. The braze material according to claim 1, wherein the second material of the particulates is more susceptible to heating by microwave radiation than the first material of the particles.

18. The braze material according to claim 17, wherein the second material of the particulates is chosen from the group consisting of silicon, germanium, gallium, cobalt, iron, zinc, titanium, carbon, aluminum, tantalum, niobium, rhenium, hafnium, molybdenum, silicon carbide, nickel oxide, magnetite, and manganese dioxide.

* * * * *